United States Patent [19]

Honda et al.

[11] Patent Number: 5,198,491

[45] Date of Patent: Mar. 30, 1993

[54] COOKING UTENSILS SURFACE COATED WITH TETRAFLUOROETHLENE BASE POLYMER

[75] Inventors: Norimasa Honda, Ibaraki; Mutsusuke Namba, Settsu; Yoshiaki Kataoka, Osaka, all of Japan

[73] Assignee: Daikin Industries Ltd., Osaka, Japan

[21] Appl. No.: 887,605

[22] Filed: May 22, 1992

Related U.S. Application Data

[60] Continuation of Ser. No. 466,780, Jan. 18, 1990, abandoned, which is a division of Ser. No. 376,230, Jul. 3, 1989, Pat. No. 4,914,146, which is a continuation of Ser. No. 76,020, Jul. 21, 1987, abandoned.

[30] Foreign Application Priority Data

Jul. 21, 1986 [JP] Japan ................................ 61-172350
Jan. 5, 1987 [JP] Japan .................................... 62-642

[51] Int. Cl.$^5$ .................. C08K 3/34; C08L 27/12; A47J 37/10

[52] U.S. Cl. ...................................... 524/449; 99/349; 99/376; 99/422; 99/425; 126/390; 428/324; 428/327; 428/422; 524/544; 524/545; 524/546

[58] Field of Search ............... 524/449, 544, 545, 546; 126/390; 99/326, 349, 422, 425; 428/324, 422, 327

[56] References Cited

U.S. PATENT DOCUMENTS 3,877,970 4/1975 Edmonds et al. .................... 528/373
3,935,347 1/1976 Blackwell .......................... 427/407.1
4,568,275 2/1986 Sakurai .............................. 432/60

Primary Examiner—Herbert J. Lilling
Attorney, Agent, or Firm—Birch, Stewart, Kolasch & Birch

[57] ABSTRACT

A tetrafluoroethylene base polymer-containing coating composition comprising a dispersion of a tetrafluoroethylene base polymer having a molecular weight of at least 5,000,000 in a liquid medium containing a surfactant, which is particularly useful for coating a fixing heater roller and a cooking utensil.

8 Claims, No Drawings

COOKING UTENSILS SURFACE COATED WITH TETRAFLUOROETHLENE BASE POLYMER

This application is a continuation of application Ser. No. 07/466,780 filed on Jan. 18, 1990, now abandoned, which is a divisional of application Ser. No. 07/376,230 filed Jul. 3, 1989, now U.S. Pat. No. 4,914,146 which is a continuation of Ser. No. 07/076,020 filed Jul. 21, 1987, now abandoned.

BACKGROUND OF THE INVENTION

1. Field of the Invention

The present invention relates to a polytetrafluoroethylene (PTFE) containing coating composition and the use thereof. More particularly, it relates to a coating composition containing PTFE having a molecular weight of at least 5,000,000 and an article having a surface which is coated with said PTFE such as a fixing heater roller and a cooking utensil.

2. Description of the Prior Arts

To impart non-tackiness and stain-proofing properties to various articles, a fluororesin, particularly PTFE is coated on the surface of the articles.

Since PTFE has very poor adhesivity to the article material, various attempts have been made to improve the adhesivity of PTFE to the material by adding additives to the PTFE containing coating composition. However, none of the conventional PTFE containing coating composition is satisfactory.

Particularly, a cooking utensil is used under very severe conditions such as a very high temperature and has to withstand rubbings with a metallic or wooden tool or corrosion by seasonings such as salt, vinegar, oil, etc., for an extended period of time.

In an electrostatic process copying machine which is now mainly used as a copying machine or a facsimile machine, a toner image is fixed onto a sheet of paper by heating and pressurizing the sheet of paper bearing the toner image between a fixing heater roller and a pressure roller.

During the fixing of the toner image on the paper, the peripheral surface of the fixing heater roller is heated at a temperature of 150° to 200° C. so that the toner image to be fixed is melted onto the surface of the paper. Therefore, the toner image tends to adhere to the peripheral surface of the fixing heater roller. Once the toner adheres to the surface of the fixing heater roller, an offset phenomenon of the image occurs, and causes the copied image and/or the paper to be dirty.

To prevent the offset phenomenon, the peripheral surface of the fixing heater roller is covered with a fluorine-containing resin having good releasing properties and heat resistance such as PTFE (cf. U.S. Pat. No. 4,568,275). Since PTFE is negatively charged, it easily electrostatically couples with the toner which is generally positively charged so that the toner easily adheres to the PTFE. Further, since conventionally used PTFE has a molecular weight of not greater than about 4,000,000, it is crystalline and has a band structure. Thus, a coating comprising conventional PTFE, tends to have irregularity on its surface and has poor releasing properties.

Also proposed is a fixing heater roller having a peripheral surface which is coated with a tetrafluoroethylene/perfluoroalkyl vinyl ether copolymer (hereinafter referred to as "PFA") and practically used. However, such a fixing heater roller covered with PFA, does not have satisfactory durability or offset resistance.

SUMMARY OF THE INVENTION

One object of the present invention is to provide a tetrafluoroethylene base polymer-containing coating composition which can form a coating of the tetrafluoroethylene base polymer on various materials and has good heat resistance, wear resistance, scratch resistance and the like.

Another object of the present invention is to provide a fixing heater roller having good wear resistance, scratch resistance and durability.

A further object of the present invention is to provide a fixing heater roller by which a non-offset range can be set wider than the conventional fixing heater roller.

A yet another object of the present invention is to provide a cooking utensil having a surface coating of PTFE which does not become flawed or removed after an extended period of use.

According to one aspect of the present invention, there is provided a tetrafluoroethylene base polymer-containing coating composition comprising a dispersion of a tetrafluoroethylene base polymer having a molecular weight of at least 5,000,000 in a liquid medium containing a surfactant.

According to another aspect of the present invention, there is provided a fixing heater roller comprising a roller base member and a covering layer which comprises a tetrafluoroethylene base polymer having a molecular weight of at least 5,000,000 and which is covered on the peripheral surface of the base member.

According to a further aspect of the present invention, there is provided a cooking utensil having a surface which is coated by a layer of a tetrafluoroethylene base polymer having a molecular weight of at least 5,000,000.

In the present invention, the tetrafluoroethylene base polymer may optionally contain PFA.

DETAILED DESCRIPTION OF THE INVENTION

The tetrafluoroethylene base polymer is intended to define a homopolymer of tetrafluoroethylene having a molecular weight of at least 5,000,000, preferably not higher than 9,000,000 or a copolymer of the same molecular weight consisting of tetrafluoroethylene and less than 1% by weight, preferably less than 0.5% by weight of a comonomer as a modifier. Examples of the comonomer are hexafluoropropylene, vinyl fluoride, vinylidene fluoride, perfluoroalkyl vinyl ether (e.g. perfluoromethyl vinyl ether, perfluoroethyl vinyl ether and perfluoropropyl vinyl ether), chlorotrifluoroethylene, ethylene, propylene, acrylates, etc. Among the tetrafluoroethylene base polymers, PTFE is preferred. As the tetrafluoroethylene base polymer, one prepared by emulsion polymerization having a primary particle size of 0.1 to 0.5 μm is preferably used.

According to a study by the present inventors, when the tetrafluoroethylene base polymer has a molecular weight of 5,000,000 or higher, its crystallinity decreases. The coating of such a polymer forms less pin holes and has better surface smoothness than a coating comprising a crystalline tetrafluoroethylene base polymer having a molecular weight lower than 5,000,000.

In the present specification, the molecular weight is the "number average molecular weight". The molecular weight (Mn) of the tetrafluoroethylene base polymer is calculated by the following equation from a specific gravity (hereinafter referred to as "S.G.") of the polymer:

$$\log_{10} Mn = 28.524 - 9.967 \times S.G.$$

According to this equation, for example, the molecular weight of 5,000,000 and 8,000,000 correspond to S.G. of 2.19 and 2.17, respectively. In other words, the term "molecular weight of 5,000,000 to 8,000,000" used in the present specification has the same meaning as "S.G. of 2.19 to 2.17".

The S.G. of the polymer can be measured in the following manner:

A sample of the polymer powder (5 g) is compressed in a mold having an inner diameter of 32 mm in an atmosphere kept at a temperature of 23° to 25° C. under a pressure of 200 kg/cm², and the sample thus treated is removed from the mold and sintered in an air heating furnace at a temperature of 380° C. for 30 minutes, cooled to 300° C. at a cooling rate of 70° C./hour, and then the sintered sample is removed from the furnace and allowed to cool to room temperature in air. The weight of the sample thus obtained is measured. The S.G. is defined as follows:

$$S.G. = 0.04864 + 0.9822 \times \text{(a ratio of the sample weight in the air to that of water having the same volume at 23° C.)}$$

The content of the tetrafluoroethylene base polymer in the coating composition is usually from 10 to 60% by weight.

Examples of the surfactant contained in the coating composition are nonionic surfactants (e.g. Nonion HS-208 manufactured by Nippon Oil and Fat Co., Ltd.), anionic surfactants (e.g. Emal manufacture by Kao) and the like. The content of the surfactant in the coating composition is from 5 to 10 parts by weight per 100 parts by weight of the tetrafluoroethylene base polymer.

The liquid medium may be any one of the liquid mediums which are conventionally used for the preparation of the coating composition containing PTFE. Preferred examples of the liquid mediums are water and organic solvents (e.g. toluene, xylene, etc.).

The coating composition of the present invention may be prepared by adding the surfactant and optional solid additives for modifying the coating properties of the dispersion of the tetrafluoroethylene base polymer in the liquid medium.

For example, the coating composition may contain mica powder or flakes or mica flakes covered with a pigment. The mica powder or flake preferably has an average particle size of 10 to 100 μm, particularly 15 to 50 μm. When the mica powder or flakes are contained in the polymer, the content of the mica powder or flakes in the polymer is from 1 to 10% by weight, preferably 2 to 8% by weight.

In addition, the coating composition may contain electrically conductive particles or fibers, which can be any of the commercially available ones such as particles or fibers of carbon or metal (e.g. silver and aluminum). The content of the electrically conductive particles or fibers is from 1 to 20% by weight, preferably from 2 to 10% by weight based on the weight of the polymer.

Further, the coating composition may contain a pigment for coloring the coated tetrafluoroethylene base polymer (e.g. chromium oxide, titanium oxide, carbon black, etc.), an antiwear additive (e.g. metal powder, ceramic materials, etc.), an organic polymer for improving the adhesivity and/or surface smoothness of the coated tetrafluoroethylene base polymer (e.g. melting fluororesins, acrylic resins, and heat-resistant polymers such as polyamide, polyimide, polyallylenesulfide and polyethersulfone).

When the electrically conductive particles or fibers and/or other additives are contained together with the mica flakes, their total amount is preferably not more than 20% by weight based on the weight of the polymer.

In addition, the tetrafluoroethylene base polymer optionally contains 5 to 30% by weight of PFA. In the present invention, PFA contains 1 to 10% by weight of the perfluoroalkyl vinyl ether. Preferably, it has a melt viscosity of $0.5 \times 10^4$ to $20 \times 10^4$ poise (at 380° C.).

The tetrafluoroethylene base polymer and optionally PFA may be coated on the peripheral surface of the roller base member by a per se conventional method. For example, after a primer coating is applied on the peripheral surface of the roller base member, a suspension comprising the tetrafluoroethylene base polymer and optionally the additives and/or PFA is coated on the peripheral surface of the roller base member followed by evaporation of the solvent and baking.

The fixing heater roller of the present invention has good heat resistance and scratch resistance, and does not suffer from initial offset or stain of the roller surface. Thus, it has improved durability.

Further, the fixing heater roller of the present invention has a larger non-offset range and improved copying reliability. For example, the non-offset range of the fixing heater roller of the present invention is wider by about 10° C. at both of the higher and lower limits than the conventional fixing heater roller.

Since the fixing heater roller of the present invention has good non-adhesivity, a cleaning system of the copying machine can be made simple.

The cooking utensil may be any one of the conventional cooking utensils such as a frying pan, a cooking plate, a grill pan, an egg baking pan and other pans.

The present invention will be hereinafter explained further in detail by following examples, in which parts and % are by weight unless otherwise indicated.

EXAMPLE 1

A roller base member made of aluminum having an outer diameter of 40 mm and a length of 340 mm is used. After the usual surface preparation of the roller base member for fluorine-containing resin coating (blast treatment and primer coating), a coating composition consisting of an aqueous dispersion containing PTFE (Mn=6 million) and mica flake (average particle size=35 μm) in a weight ratio of 97:3 is applied to produce a fixing heater roller having a coating of about 30 μm in thickness.

EXAMPLE 2

In the same manner as in Example 1 but using an aqueous dispersion containing PTFE (Mn=6.5 million), the tetrafluoroethylene/perfluoroalkyl vinyl ether copolymer (content of fluoroalkyl vinyl ether=3%, melt viscosity=$1 \times 10^4$ poise) and conductive carbon powder in a weight ratio of 85:10:5, the roller base member is coated to produce a fixing heater roller.

EXAMPLE 3

In the same manner as in Example 1 but using no mica flake, the roller base member is coated to produce a fixing heater roller.

COMPARATIVE EXAMPLE 1

In the same manner as in Example 1 but using PTFE having a molecular weight of 3,000,000, the roller base member is coated to produce a fixing heater roller.

COMPARATIVE EXAMPLE 2

On the same aluminum roller base member as used in Example 1, a tetrafluoroethylene/perfluoroalkyl vinyl ether copolymer containing no mica flake is powder coated to form a coating having a thickness of about 30 $\mu m$ on the peripheral surface of the roller base member.

EXPERIMENT 1

As a fixing heater roller, each roller produced in Examples 1-3 or Comparative Examples 1-2 is installed in a xerography type copying machine. Copy is made on a predetermined number of sheets (20,000 sheets, 50,000 sheets or 100,000 sheets) of paper at a fixing temperature of 180° to 200° C. and a copying rate of 180 mm/sec. (without any releasing oil). Thereafter, the maximum wear depth on the roller surface is measured by a tracer method surface roughness meter. The results are shown in Table 1.

TABLE 1

| Example No. | Maximum wear depth ($\mu m$) After copying | | |
|---|---|---|---|
| | 20,000 sheets | 50,000 sheets | 100,000 sheets |
| 1 | 1-2 | 1-2 | 2-5 |
| 2 | 1-2 | 1-2 | 1-3 |
| 3 | 1-2 | 1-2 | 4-6 |
| Comp. 1 | 7-9 | 7-10 | 9-16 |
| Comp. 2 | 5-8 | 7-10 | 10-15 |

EXPERIMENT 2

As a fixing heater roller, each roller produced in Examples 1-3 or Comparative Examples 1-2 is installed in a xerography type copying machine. Copy is carried out at a fixing temperature of 180° to 200° C. and a copying rate of 180 mm/sec. under surface pressure of 40 kg. When the roller of Comparative Example is used, the roller surface is stained after 1,000 sheets of A-4 sized paper are copies and offset occurred, while when the roller of the present invention of Example is used, adherence of the toner or offset did not occur after copying 20,000 sheets of paper.

In the following examples, a frying pan as a typical example of the cooking utensil is coated by the coating composition of the present invention. In these examples, coating of the composition on an aluminum frying pan and evaluation of the properties of the coated layer are carried out as follows:

Coating of the composition

After treating a surface of an aluminum frying pan having a thickness of 2.4 mm, a primer for fluororesin (Polyflon Enamel (trade mark) EK-1909 BKN manufactured by Daikin Industries Ltd.) is spray coated on the surface of the frying pan and dried. Then, a coating composition is spray coated on the primer and dried in an infrared dryer at about 100° C. for 10 minutes. Thereafter, the coated frying pan is baked in an electric furnace at 380° C. for 10 minutes to form a fluororesin coating layer of 30 $\mu m$ in thickness including the primer. The thus coated frying pan is subjected to the following tests.

Wear resistance

Before the test, five parallel lines with each distance of 25 mm are cut to a depth reaching the surface of the aluminum base. With fixing the frying pan, a commercially available metal scrubbing brush (made of 18-8 stainless steel wire, 50 g) is placed on the surface of the frying pan having the cut lines and reciprocated with applying a load of 1 kg on the average in a direction perpendicular to the direction of the lines at a rate of 70 times/min. with such amplitude that the center of the brush crosses at least 3 cut lines (namely, an amplitude of at least 50 mm). Simultaneously, the brush is rotated at 70 rpm, and the frying pan is heated at about 200° to 220° C. After the brush is reciprocated for up to 10,000 times under such conditions, peeling of the coating is observed. However, when the coating is peeled off between two cut lines and the aluminum base is continuously exposed between the lines before 10,000 time reciprocation, the test is stopped.

Cooking test

On the coated aluminum frying pan, two loafs of chinese noodle, sliced vegetables and meat and seasonings are fried for 17 minutes on the average on gas flames with medium strength while mixing them with a wooden knife to prevent scorching. The cooking of the noodle is repeated, and sticking of the noodle to the surface of the frying pan is observed. The number of cooking cycles is recorded until the scorching is not removable by the wooden knife or the scorching mark remains.

EXAMPLE 4

To a 60% aqueous dispersion of PTFE ($Mn = 6$ million) (8,000 parts) contained in a stirring tank having a propeller stirrer, a 25% aqueous solution of sodium lauryl sulfate (195 parts), a 25% aqueous solution of polyoxyethylene type nonionic surfactant (1,840 parts), toluene (152 parts) and pure water (1,255 parts) are added in this order with stirring. Then, the mixture is stirred for 20 minutes to prepare an aqueous coating composition, which has a solid content of 42%, pH of 9.5 and viscosity of 210 cp (at 25° C.).

The properties of the coating formed on the frying pan from this composition are shown in Table 2 below.

EXAMPLE 5

The coating composition prepared in Example 4 (2,380 parts) is charged in the stirrer. To the composition, mica powder having an average particle size of 35 $\mu m$ (200 parts) and a 24.4% aqueous paste of carbon black (8 parts) are added in this order with stirring and stirred for 20 minutes in total to prepare a coating composition, which has a solid content of 42%, pH of 9.5 and viscosity of 220 cp (at 25° C.).

The properties of the coating formed on the frying pan from this composition are shown in Table 2 below.

EXAMPLE 6

In the same manner as in Example 4 but using PTFE having a molecular weight of 5,400,000, a coating composition is prepared.

The properties of the coating formed on the frying pan from this composition are shown in Table 2 below.

EXAMPLE 7

In the same manner as in Example 5 but using the coating composition prepared in Example 6, a coating composition is prepared.

The properties of the coating formed on the frying pan from this composition are shown in Table 2 below.

EXAMPLE 8

In the same manner as in Example 4 but using PTFE having a molecular weight of 7,100,000, a coating composition is prepared.

The properties of the coating formed on the frying pan from this composition are shown in Table 2 below.

EXAMPLE 9

In the same manner as in Example 5 but using the coating composition prepared in Example 8, a coating composition is prepared.

The properties of the coating formed on the frying pan from this composition are shown in Table 2 below.

COMPARATIVE EXAMPLE 3

In the same manner as in Example 4 but using PTFE having a molecular weight of 3,000,000, a coating composition is prepared.

The properties of the coating formed on the frying pan from this composition are shown in Table 2 below.

COMPARATIVE EXAMPLE 4

In the same manner as in Example 5 but using the coating composition prepared in Comparative Example 3, a coating composition is prepared.

The properties of the coating formed on the frying pan from this composition are shown in Table 2 below.

COMPARATIVE EXAMPLE 5

In the same manner as in Example 4 but using PTFE having a molecular weight of 4,500,000, a coating composition is prepared.

The properties of the coating formed on the frying pan from this composition are shown in Table 2 below.

COMPARATIVE EXAMPLE 6

In the same manner as in Example 5 but using the coating composition prepared in Comparative Example 5, a coating composition is prepared.

The properties of the coating formed on the frying pan from this composition are shown in Table 2 below.

TABLE 2

| Example No. | Wear resistance (No. of reciprocations) | Cooking test (No. of cooking) |
| --- | --- | --- |
| 4 | 6,000 | >800 |
| 5 | >10,000 | >800 |
| 6 | 5,000 | >800 |
| 7 | >10,000 | >800 |
| 8 | 8,000 | >800 |
| 9 | >10,000 | >800 |
| Comp. 3 | 2,100 | 230 |
| Comp. 4 | 3,300 | 350 |
| Comp. 5 | 2,900 | 450 |
| Comp. 6 | 4,000 | 550 |

What is claimed is:

1. A cooking utensil, a surface of which is coated with a layer comprising tetrafluoroethylene base polymer having a molecular weight of at least 5,000,000 and an effective amount of not more than 20% by weight based on the weight of the base polymer of an organic polymer for improving the adhesivity and/or surface smoothness.

2. The cooking utensil according to claim 4, wherein the tetrafluoroethylene base polymer further contains a solid additive for modifying properties of the coating.

3. The cooking utensil according to claim 2, wherein the solid additive is at least one selected from the group consisting of mica powder or flakes, a pigment, metal powder, a ceramic material and an antistatic agent.

4. The cooking utensil according to claim 3, wherein the solid additive is mica powder.

5. The cooking utensil according to claim 1, wherein the tetrafluoroethylene base polymer is polytetrafluoroethylene.

6. The cooking utensil according to claim 1, wherein the tetrafluoroethylene base polymer has a molecular weight of 5,000,000 to 9,000,000.

7. The cooking utensil according to claim 5, wherein the polytetrafluoroethylene has a molecular weight of 5,000,000 to 9,000,000.

8. The cooking utensil according to claim 1, wherein the organic polymer is a heat-resistant polymer.

* * * * *